(12) United States Patent
Ransom

(10) Patent No.: US 8,410,635 B2
(45) Date of Patent: Apr. 2, 2013

(54) SYSTEMS AND METHODS FOR DEACTIVATING A MATRIX CONVERTER

(75) Inventor: Ray M. Ransom, Big Bear City, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 270 days.

(21) Appl. No.: 12/725,265

(22) Filed: Mar. 16, 2010

(65) Prior Publication Data

US 2011/0227407 A1    Sep. 22, 2011

(51) Int. Cl.
H02J 1/00    (2006.01)
H02J 3/00    (2006.01)

(52) U.S. Cl. .......................... 307/82; 307/9.1

(58) Field of Classification Search .............. 307/9.1, 307/82; 363/121, 131, 132
See application file for complete search history.

(56) References Cited

U.S. PATENT DOCUMENTS

| | | | |
|---|---|---|---|
| 4,669,036 A | 5/1987 | Cowett, Jr. | |
| 5,189,603 A | 2/1993 | Sashida et al. | |
| 5,461,297 A | 10/1995 | Crawford | |
| 5,545,971 A | 8/1996 | Gomez et al. | |
| 5,949,659 A | 9/1999 | Lesche | |
| 6,034,513 A | 3/2000 | Farrington et al. | |
| 6,147,886 A | 11/2000 | Wittenbreder | |
| 6,351,397 B1 * | 2/2002 | Sawa et al. ................ | 363/50 |
| 6,538,909 B2 | 3/2003 | Goodarzi et al. | |
| 6,583,519 B2 | 6/2003 | Aberle et al. | |
| 6,989,613 B2 | 1/2006 | Andrews et al. | |
| 6,998,732 B2 | 2/2006 | Xing et al. | |
| 7,330,363 B2 | 2/2008 | Ponnaluri et al. | |
| 7,483,282 B2 | 1/2009 | Kajouke et al. | |
| 7,492,221 B2 | 2/2009 | Lawson et al. | |
| 7,525,296 B2 | 4/2009 | Billig et al. | |
| 7,599,204 B2 | 10/2009 | Kajouke et al. | |
| 7,679,941 B2 | 3/2010 | Raju et al. | |
| 7,764,527 B2 | 7/2010 | Takayanagi | |
| 8,063,606 B2 | 11/2011 | Veselic | |
| 8,199,545 B2 | 6/2012 | Nguyen et al. | |
| 2001/0012207 A1 | 8/2001 | Nomura | |
| 2001/0026427 A1 | 10/2001 | Mahlein et al. | |
| 2001/0036086 A1 | 11/2001 | Pascu et al. | |

(Continued)

FOREIGN PATENT DOCUMENTS

| | | |
|---|---|---|
| DE | 102007040550 A1 | 3/2008 |
| GB | 2459542 A | 11/2009 |
| JP | 2008306855 A | 12/2008 |

OTHER PUBLICATIONS

Office Action, dated Oct. 5, 2011, for U.S. Appl. No. 12/413,181.

(Continued)

*Primary Examiner* — Carlos Amaya
(74) *Attorney, Agent, or Firm* — Ingrassia Fisher & Lorenz, P.C.

(57) ABSTRACT

Systems and methods are provided for deactivating a matrix conversion module. An electrical system comprises an alternating current (AC) interface, a matrix conversion module coupled to the AC interface, an inductive element coupled between the AC interface and the matrix conversion module, and a control module. The control module is coupled to the matrix conversion module, and in response to a shutdown condition, the control module is configured to operate the matrix conversion module to deactivate the first conversion module when a magnitude of a current through the inductive element is less than a threshold value.

18 Claims, 3 Drawing Sheets

U.S. PATENT DOCUMENTS

| | | | |
|---|---|---|---|
| 2002/0044468 | A1 | 4/2002 | Goodarzi et al. |
| 2002/0176261 | A1 | 11/2002 | Norrga |
| 2003/0102718 | A1 | 6/2003 | Hockney et al. |
| 2004/0026929 | A1 | 2/2004 | Rebsdorf et al. |
| 2004/0041543 | A1 | 3/2004 | Brooks et al. |
| 2004/0066663 | A1 | 4/2004 | Raichle |
| 2004/0119449 | A1 | 6/2004 | Matley |
| 2004/0257271 | A1 | 12/2004 | Jacobson et al. |
| 2007/0035265 | A1 | 2/2007 | Balog, Jr. et al. |
| 2007/0139975 | A1 | 6/2007 | Yamauchi et al. |
| 2007/0274109 | A1 | 11/2007 | Oyobe et al. |
| 2008/0013351 | A1 | 1/2008 | Alexander |
| 2008/0055938 | A1* | 3/2008 | Kajouke et al. ............ 363/13 |
| 2008/0055954 | A1 | 3/2008 | Kajouke et al. |
| 2008/0130339 | A1 | 6/2008 | McDonald et al. |
| 2009/0033393 | A1 | 2/2009 | Park et al. |
| 2009/0251938 | A1 | 10/2009 | Hallak |
| 2009/0322287 | A1 | 12/2009 | Ozeki et al. |
| 2010/0103703 | A1 | 4/2010 | Nishiyama et al. |
| 2011/0032732 | A1 | 2/2011 | Hsu |
| 2011/0080151 | A1 | 4/2011 | Rahardjo et al. |
| 2011/0089928 | A1 | 4/2011 | O'Gorman et al. |

OTHER PUBLICATIONS

U.S. Office Action, dated Nov. 25, 2011, for U.S. Appl. No. 12/622,088.

U.S. Office Action, dated Jan. 23, 2012, for U.S. Appl. No. 12/535,994.

Figueres, E., et al. "A Control Circuit With Load-Current Injection for Single-Phase Power-Factor-Correction Rectifiers," IEEE Transactions on Industrial Electronics, Jun. 2007, pp. 1272-1281, vol. 54, No. 3.

Prathapan, P.T., et al., "Feedforward Current Control of Boost-Derived Single-phase PFC Converters," IEEE Applied Power Electronics Conference and Exposition, Mar. 2005, pp. 1716-1722, vol. 3.

German Office Action, dated Jan. 27, 2012, for German Patent Application No. 10 2010 031 615.6.

U.S. Office Action, dated Feb. 8, 2012, for U.S. Appl. No. 12/535,975.

Kajouke, L.A., et al., "Systems and Methods for Reducing Transient Voltage Spikes in Matrix Converters," U.S. Appl. No. 12/839,134, filed Jul. 19, 2010.

Perisic, M., et al. "Compensation for Electrical Converter Nonlinearities," U.S. Appl. No. 12/941,552, filed Nov. 8, 2010.

Perisic, M., et al. "Systems and Methods for Providing Power to a Load Based Upon a Control Strategy," U.S. Appl. No. 12/949,439, filed Nov. 18, 2010.

Ransom, Ray., et al. "Systems and Methods for Initializing a Charging System," U.S. Appl. No. 13/149,484, filed May 31, 2011.

Perisic, M., et al. "Compensation for Electrical Converter Nonlinearities," U.S. Appl. No. 12/941,521, filed Nov. 8, 2010.

Kajouke, L.A., et al. "Systems and Methods for Reducing Harmonic Distortion in Electrical Converters," U.S. Appl. No. 12/941,488, filed Nov. 8, 2010.

Delorme, Gilles M., et al. "Methods and Systems for Controlling Vehicle Defrost Units," U.S. Appl. No. 12/871,664, filed Aug. 30, 2010.

Kajouke, L.A., et al. "Discharging a DC Bus Capacitor of an Electrical Converter System," U.S. Appl. No. 13/090,911, filed Apr. 20, 2011.

Perisic, M., et al. "Systems and Methods for Providing Power to a Load Based Upon a Control Strategy," U.S. Appl. No. 13/222,961, filed Aug. 31, 2011.

Ransom R.M., et al. "Systems and Methods for Commutating Inductor Current Using a Matrix Converter," U.S. Appl. No. 12/622,088, filed Nov. 19, 2009.

Kajouke, L.A., "Unity Power Factor Isolated Single Phase Matrix Converter Battery Charger," U.S. Appl. No. 12/413,181, filed Mar. 27, 2009.

Kajouke, L.A., "Systems and Methods for Bi-Directional Energy Delivery With Galvanic Isolation," U.S. Appl. No. 12/535,975, filed Aug. 5, 2009.

Kajouke, L.A., et al. "Charging System With Galvanic Isolation and Multiple Operating Modes," U.S. Appl. No. 12/535,994, filed Aug. 5, 2009.

German Office Action, dated Mar. 21, 2012, for German Patent Application No. 10 2011 085 063.5.

Chu, Grace, et al., "A Unified Approach for the Derivation of Robust Control for Boost PFC Converters," IEEE Transactions on Power Electronics, Nov. 2009, pp. 2531-2544, vol. 24, Issue: 11.

USPTO, U.S. "Final Office Action" mailed Jun. 28, 2012, for U.S. Appl. No. 12/535,994, filed Aug. 5, 2008.

USPTO, U.S. "Final Office Action" mailed May 10, 2012, for U.S. Appl. No. 12/413,181, filed Mar. 27, 2009.

USPTO, U.S. "Notice of Allowance" mailed Jun. 11, 2012, for U.S. Appl. No. 12/622,088, filed Nov. 19, 2009.

Office Action, dated Aug. 29, 2012, for U.S. Appl. No. 12/839,134.

Final Office Action, dated Aug. 2, 2012, for U.S. Appl. No. 12/535,994.

Office Action, dated Oct. 24, 2012, for U.S. Appl. No. 12/941,552.

Office Action, dated Nov. 9, 2012, for U.S. Appl. No. 12/949,439.

Notice of Allowance, dated Nov. 16, 2012, for U.S. Appl. No. 12/535,975.

USPTO "Notice of Allowance" mailed Jan. 25, 2013; U.S. Appl. No. 12/839,134, filed Jul. 19, 2010.

* cited by examiner

SYSTEMS AND METHODS FOR DEACTIVATING A MATRIX CONVERTER

STATEMENT REGARDING FEDERALLY SPONSORED RESEARCH OR DEVELOPMENT

This invention was made with Government support under Agreement No. DE-FC26-07NT43123, awarded by the United States Department of Energy. The Government has certain rights in this invention.

TECHNICAL FIELD

Embodiments of the subject matter described herein relate generally to electrical systems in automotive vehicles, and more particularly, embodiments of the subject matter relate to energy delivery systems with galvanic isolation.

BACKGROUND

Matrix converters (or cycloconverters) may be used in electric and/or hybrid vehicles to accommodate delivery of relatively high power over a relatively wide range of operating voltages, while at the same time achieving galvanic isolation, relatively high power factors, low harmonic distortion, relatively high power density and low cost. Matrix converters may be used to deliver energy from an alternating current (AC) energy source, such as the single-phase grid electricity common in most residential and commercial buildings, to a direct current (DC) energy storage element, such as a rechargeable battery, in the vehicle.

In practice, it may be desirable to shutdown or otherwise deactivate the matrix converter, for example, to stop delivering charging power to a vehicle battery or to reduce switching losses. In some matrix converter systems, one or more reactive components (e.g., inductors and/or capacitors) are present between the AC energy source and the matrix converter. When the matrix converter is deactivated, the current flowing to/from the matrix converter is interrupted or otherwise stopped. However, abruptly stopping the current to/from a reactive component(s) may result in a potentially damaging voltage spike across components of the matrix converter caused by the potential energy stored by the reactive component(s). For example, abruptly stopping the current flowing through an inductor may result in a transient voltage spike that exceeds the breakdown voltage of a semiconductor device.

Many prior art systems utilize one or more snubbers to prevent or otherwise mitigate harm that could otherwise result from voltage spikes across components of the matrix converter. Snubbers are additional lossy components that reduce the overall efficiency of operation. Accordingly, it is desirable that any potential energy stored by the reactive component(s) be discharged in a manner that protects components of the matrix converter upon shutdown without requiring the use of snubbers or other lossy components.

BRIEF SUMMARY

In accordance with one embodiment, an electrical system is provided. The electrical system comprises an alternating current (AC) interface, a first conversion module coupled to the AC interface, an inductive element coupled between the AC interface and the first conversion module, and a control module. The control module is coupled to the first conversion module, and in response to a shutdown condition, the control module is configured to operate the first conversion module to deactivate the first conversion module when a magnitude of a current through the inductive element is less than a threshold value.

In accordance with another embodiment, a method is provided for controlling an electrical system including a first conversion module and an inductive element configured electrically in series between the first conversion module and an AC interface. The method comprises operating the first conversion module to achieve a desired flow of energy from the AC interface and identifying a shutdown condition. In response to identifying the shutdown condition, the method continues by monitoring current through the inductive element, and when a magnitude of the current through the inductive element is less than a threshold value, deactivating the first conversion module.

In another embodiment, a vehicle electrical system is provided. The vehicle electrical system comprises a DC interface configured to be coupled to a DC energy source and an AC interface configured to be coupled to an AC energy source. An energy conversion module is coupled to the DC interface and a matrix converter coupled to the AC interface. An inductive element is configured electrically in series between a first node of the AC interface and the matrix converter. An isolation module is coupled between the energy conversion module and the matrix converter to provide galvanic isolation between the energy conversion module and the matrix converter. A control module is coupled to the matrix converter and configured to operate the matrix converter to deliver energy from the AC interface to the DC interface and identify a shutdown condition. In response to identifying the shutdown condition, the control module operates the matrix converter in accordance with a shutdown duty cycle, operates the matrix converter to discharge the inductive element when a magnitude of a current through the inductive element is less than a threshold value, and deactivates the matrix converter after discharging the inductive element.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
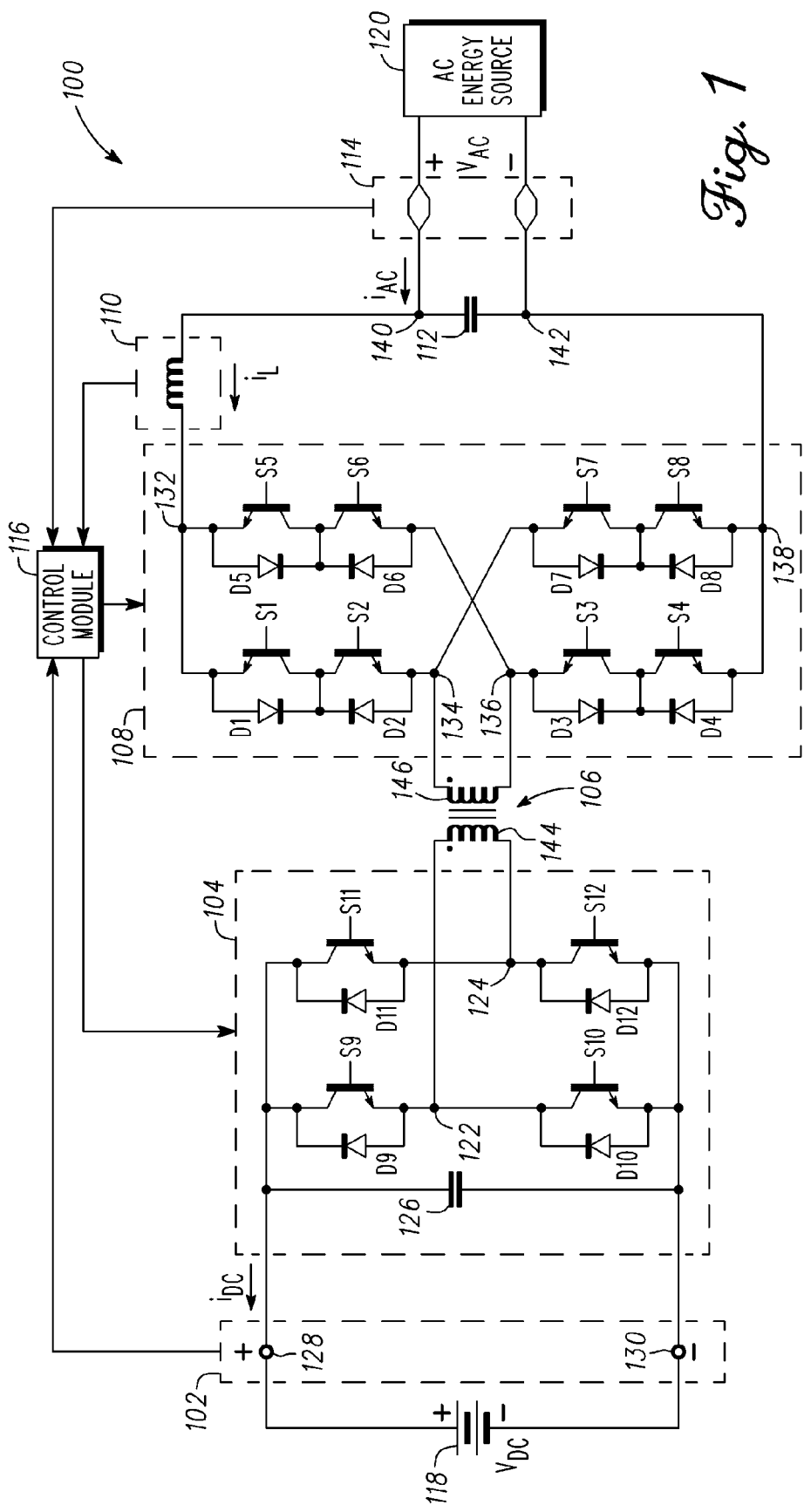
FIG. 1 is a schematic view of a electrical system suitable for use in a vehicle in accordance with one embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the figures may depict one exemplary arrangement of elements, additional intervening elements, devices, features, or components may be present in an embodiment of the depicted subject matter. In addition, certain terminology may also be used in the following description for the purpose of reference only, and thus is not intended to be limiting. The terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

Technologies and concepts discussed herein relate generally to matrix converter systems capable of discharging potential energy stored by one or more reactive components prior to deactivating, shutting down, or otherwise ceasing operation of the matrix converter. In response to identifying a shutdown condition, the matrix converter is operated with a shutdown duty cycle that ensures the flow of current to/from the matrix converter is maintained, thereby maintaining the flow of current through the reactive component(s). When the current through the reactive component(s) approaches or is otherwise at or near a zero crossing, the matrix converter is operated to discharge the reactive component(s). After discharging the reactive component(s), the matrix converter may be safely shutdown or deactivated by opening (or turning OFF) all of the switching elements of the matrix converter to reduce switching losses and prevent current from flowing to/from the matrix converter. By discharging the reactive component(s) prior to deactivating the matrix converter, the effects of any potential transient voltage spikes are mitigated, thereby allowing the matrix converter to be implemented with components having lower power/voltage handling requirements and with smaller (or entirely without) snubbers or other lossy components.

FIG. 1 depicts an exemplary embodiment of an electrical system 100 (or alternatively, a charging system, charger or charging module) suitable for use in a vehicle, such as, for example, an electric and/or hybrid vehicle. The electrical system 100 includes, without limitation, a first interface 102, a first energy conversion module 104, an isolation module 106, a second energy conversion module 108, an inductive element 110, a capacitive element 112, a second interface 114, and a control module 116. The first interface 102 generally represents the physical interface (e.g., terminals, connectors, and the like) for coupling the electrical system 100 to a DC energy source 118 and the second interface 114 generally represents the physical interface (e.g., terminals, connectors, and the like) for coupling the electrical system 100 to an AC energy source 120. Accordingly, for convenience, the first interface 102 may be referred to herein as the DC interface and the second interface 114 may be referred to herein as the AC interface. In an exemplary embodiment, the control module 116 is coupled to the conversion modules 104, 108 and deactivates (or shuts down) the second conversion module 108 in a manner that discharges potential energy stored by the inductive element 110, as described in greater detail below.

In an exemplary embodiment, the DC energy source 118 (or alternatively, the energy storage source or ESS) is capable of receiving a direct current ($i_{DC}$) from the electrical system 100 at a particular DC voltage level ($V_{DC}$). In accordance with one embodiment, the DC energy source 118 is realized as a rechargeable high-voltage battery pack. In this regard, the DC energy source 118 may comprise the primary energy source for another electrical system and/or an electric motor in a vehicle. For example, the DC energy source 118 may be coupled to a power inverter that is configured to provide voltage and/or current to the electric motor. In an exemplary embodiment, the DC energy source 118 has a nominal DC voltage range from about 200 to 500 Volts DC. In other embodiments, the DC energy source 118 may comprise a battery, a fuel cell, an ultracapacitor, or another suitable energy storage device.

In an exemplary embodiment, the AC energy source 120 (or power source) provides an AC current ($i_{AC}$) to the charging system 100 at a particular AC voltage level ($V_{AC}$). In this regard, the AC energy source 120 may be realized as a main power supply or main electrical system for a building, residence, or another structure within an electric power grid (e.g., mains electricity or grid power). In accordance with one embodiment, the AC energy source 120 comprises a single-phase power supply, as is common to most residential structures, which varies depending on the geographic region. For example, in the United States, the AC energy source 120 may be realized as 120 Volts (RMS) or 240 Volts (RMS) at 60 Hz, while in other regions the AC energy source 120 may be realized as 110 Volts (RMS) or 220 Volts (RMS) at 50 Hz. In alternative embodiments, the AC energy source 120 may be realized as any AC energy source suitable for operation with the charging system 100.

As described in greater detail below, the DC interface 102 is coupled to the first conversion module 104 and the AC interface 114 is coupled to the second conversion module 108 via the inductive element 110. The isolation module 106 is coupled between the conversion modules 104, 108 and provides galvanic isolation between the two conversion modules 104, 108. The control module 116 is coupled to the conversion modules 104, 108 and operates the conversion modules 104, 108 to achieve a desired power flow from the AC energy source 120 to the DC energy source 118 by converting energy from the AC energy source 120 to high-frequency energy across the isolation module 106 which is then converted to DC energy at the DC interface 102 by the conversion module 104. In this regard, it should be understood that although the subject matter may be described herein in the context of a grid-to-vehicle application (e.g., the AC energy source 120 delivering energy to the DC energy source 118) for purposes of explanation, in other embodiments, the subject matter described herein may be implemented and/or utilized in vehicle-to-grid applications (e.g., the DC energy source 118 delivering energy to the AC interface 114 and/or AC energy source 120).

In an exemplary embodiment, the first conversion module 104 converts high-frequency energy at nodes 122, 124 to DC energy that is provided to the DC energy source 118 at the DC interface 102. In this regard, the first conversion module 104 operates as a rectifier when converting high frequency AC energy to DC energy. In the illustrated embodiment, the first conversion module 104 comprises four switching elements (S9-S12) with each switching element having a diode (D9-D12) configured antiparallel to the respective switching element to accommodate bidirectional energy delivery. However, it should be appreciated that in some practical embodiments, the first conversion module 104 may be realized as rectifier for unidirectional energy delivery that comprises only diodes (D9-D12), and such embodiments may not include switching elements (S9-S12). As shown, the first conversion module 104 also includes a capacitor 126 configured electrically in parallel across the DC interface 102 to reduce voltage ripple at the DC interface 102, as will be appreciated in the art.

In an exemplary embodiment, the switching elements (S9-S12) are transistors, and may be realized using any suitable semiconductor transistor switch, such as a bipolar junction transistor (e.g., an IGBT), a field-effect transistor (e.g., a MOSFET), or any other comparable device known in the art. The switches and diodes are antiparallel, meaning the switch and diode are electrically in parallel with reversed or inverse polarity. The antiparallel configuration allows for bidirectional current flow while blocking voltage unidirectionally, as will be appreciated in the art. In this configuration, the direction of current through the switches is opposite to the direction of allowable current through the respective diodes. The antiparallel diodes are connected across each switch to provide a path for current to the DC energy source 118 for charging the DC energy source 118 when the respective switch is off. In order to provide energy from the DC energy source 118 to the AC interface 114 (e.g., vehicle-to-grid applications), the switches may be modulated (e.g., opened and/or closed) to provide a path for current from the DC energy source 118 to the isolation module 106 for delivering (or uploading) energy to the AC energy source. 120.

In the illustrated embodiment, switch S9 is connected between node 128 of the DC interface 102 and node 122 and configured to provide a path for current flow from node 128 to node 122 when switch S9 is closed. Diode D9 is connected between node 122 and node 128 and configured to provide a path for current flow from node 122 to node 128 (e.g., diode D9 is antiparallel to switch S9). Switch S10 is connected between node 130 of the DC interface 102 and node 122 and configured to provide a path for current flow from node 122 to node 130 when switch S10 is closed, while diode D10 is connected between node 122 and node 130 and configured to provide a path for current flow from node 130 to node 122. In a similar manner, switch S11 is connected between node 128 and node 124 and configured to provide a path for current flow from node 128 to node 124 when switch S11 is closed, diode D11 is connected between node 124 and the DC interface 102 and configured to provide a path for current flow from node 124 to node 128, switch S12 is connected between node 130 and node 124 and configured to provide a path for current flow from node 124 to node 130 when switch S12 is closed, and diode D12 is connected between node 124 and the DC interface 102 and configured to provide a path for current flow from the node 130 to node 124.

In an exemplary embodiment, the second conversion module 108 facilitates the flow of current (or energy) from the AC energy source 120 to the isolation module 106. In the illustrated embodiment, the second conversion module 108 is realized as a front end single-phase matrix converter comprising eight switching elements (S1-S8) with each switching element having a diode (D1-D8) configured antiparallel to the respective switching element, in a similar manner as set forth above in regards to the first conversion module 104. For convenience, but without limitation, the second conversion module 108 may alternatively be referred to herein as a matrix conversion module (or matrix converter) or a cycloconverter.

In the illustrated embodiment of FIG. 1, a first set of switches (S1, S2) and diodes (D1, D2) are coupled between node 132 and node 134, with the first pair of switch and antiparallel diode (e.g., S1 and D1) being configured with opposite polarity as the second pair of switch and antiparallel diode (e.g., S2 and D2). In this manner, switch S1 and diode D2 are configured to provide a path for current flow from node 134 through switch S1 and diode D2 to node 132 when switch S1 is closed, turned on, or otherwise activated and the voltage at node 134 is more positive than the voltage at node 132. Switch S2 and diode D1 are configured to provide a path for current flow from node 132 through switch S2 and diode D1 to node 134 when switch S2 is closed, turned on, or otherwise activated and the voltage at node 132 is more positive than the voltage at node 134. In a similar manner, a second set of switches (S3, S4) and diodes (D3, D4) are coupled between node 136 and node 138, a third set of switches (S5, S6) and diodes (D5, D6) are coupled between node 132 and node 136, a fourth set of switches (S7, S8) and diodes (D7, D8) are coupled between node 134 and node 138. In an exemplary embodiment, the switches (S1-S8) of the matrix converter 108 are modulated (e.g., opened and/or closed) in a manner such that the AC current ($i_{AC}$) from the AC interface 114 achieves a desired power flow to the DC interface 102 and/or DC energy source 118.

In an exemplary embodiment, the isolation module 106 comprises a first set of windings 144 connected between nodes 122, 124 of the first conversion module 104 and a second set of windings 146 connected between nodes 134, 136. For purposes of explanation, the windings 146 may be referred to herein as comprising the primary winding stage (or primary windings) and the sets of windings 144 may be referred to herein as comprising the secondary winding stage (or secondary windings). The windings 144, 146 provide inductive elements that are magnetically coupled in a conventional manner to form a transformer, as will be appreciated in the art. In an exemplary embodiment, the isolation module 106 is realized as a high-frequency transformer. In this regard, the isolation module 106 comprises a transformer designed for a particular power level at a high-frequency, such as the switching frequency of the switches of the conversion modules 104, 108 (e.g., 50 kHz), resulting in the physical size of the transformer being reduced relative to a transformer designed for the same power level at a lower frequency, such as the frequency of the AC energy source 120 (e.g., the mains frequency).

In an exemplary embodiment, the inductive element 110 is realized as an inductor configured electrically in series between node 132 of the matrix converter 108 and a node 140 of the AC interface 114. The inductor 110 functions as a high-frequency inductive energy storage element during operation of the electrical system 100. The capacitive element 112 is realized as a capacitor coupled between node 140 and node 142 of the AC interface 114, and the capacitor 112 and inductor 110 are cooperatively configured to provide a high frequency filter to minimize voltage ripple at the AC interface 114, as will be appreciated in the art. As described in greater detail below, during operation of the electrical system 100, the matrix converter 108 is operated to discharge and/or commutate current through the inductor 110 to prevent voltage spikes when the switches of the matrix converter 108 are opened, turned off, or otherwise deactivated.

The control module 116 generally represents the hardware, firmware and/or software configured to operate and/or modulate the switches of the conversion modules 104, 108 to achieve a desired power flow between the DC energy source 118 and the AC energy source 120. In this regard, during normal operation for grid-to-vehicle applications, the control module 116 determines pulse-width modulated (PWM) command signals that control the timing and duty cycles of the switches (S1-S8) of the matrix converter 108 such that a desired current ($i_{DC}$) flows to the DC interface 102. Depending on the embodiment, the control module 116 may be implemented or realized with a general purpose processor, a microprocessor, a microcontroller, a content addressable memory, a digital signal processor, an application specific integrated circuit, a field programmable gate array, any suitable programmable logic device, discrete gate or transistor logic, discrete hardware components, or any combination thereof, designed to support and/or perform the functions described herein.

As described in greater detail below, in an exemplary embodiment, in response to a shutdown condition, the control module 116 determines a shutdown duty cycle for the PWM command signals used to operate switches (S1-S8) of the matrix converter 108 and operates the matrix converter 108 in accordance with the shutdown duty cycle. In accordance with one or more embodiments, the control module 116 is coupled to the DC interface 102 and the AC interface 114, and in response to the shutdown condition, determines the shutdown duty cycle for the PWM command signals based at least in part on or more of the following: the voltage at the AC interface 114 ($V_{AC}$), the voltage at the DC interface 102 ($V_{DC}$), and the current at the DC interface 102 ($i_{DC}$). The control module 116 obtains or otherwise monitors the current ($i_L$) through the inductor 110 (e.g., a measured inductor current via a current sensor) and verifies or otherwise determines the inductor current is sufficiently close to zero before operating the matrix converter 108 to discharge the inductor 110. After discharging the inductor 110, the control module 116 deactivates or otherwise shuts down the matrix converter 108.

It should be understood that FIG. 1 is a simplified representation of a electrical system 100 for purposes of explanation and is not intended to limit the scope or applicability of the subject matter described herein in any way. Thus, although FIG. 1 depicts direct electrical connections between circuit elements and/or terminals, alternative embodiments may employ intervening circuit elements and/or components while functioning in a substantially similar manner. Additionally, although the electrical system 100 is described herein in the context of vehicle 120, the subject matter is not intended to be limited to vehicular and/or automotive applications, and the subject matter described herein may be implemented in any application where a matrix converter is utilized to transfer energy from an AC energy source to a DC energy source.

Figure 2:
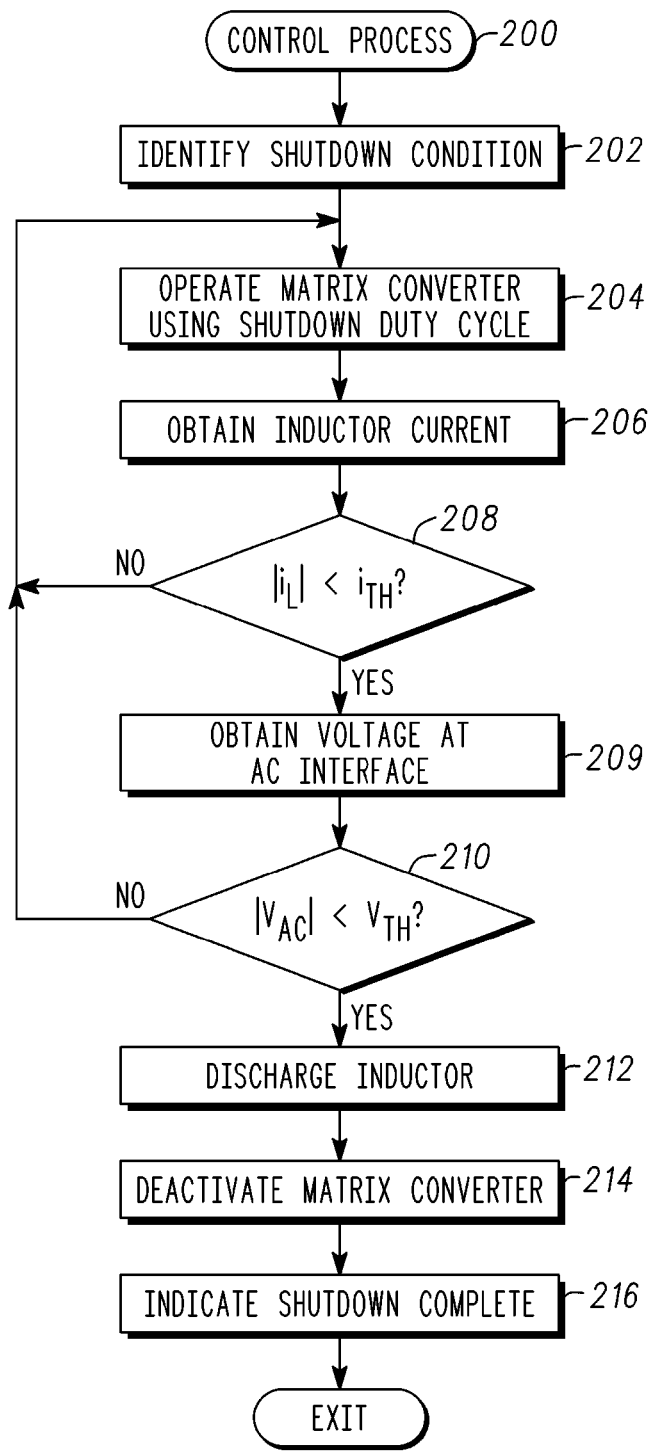
FIG. 2 is a flow diagram of control process suitable for use with the electrical system of FIG. 1 in accordance with one embodiment.

Referring now to FIG. 2, in an exemplary embodiment, an electrical system may be configured to perform a control process 200 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the first conversion module 104, the isolation module 106, the matrix converter 108, and/or the control module 116. It should be appreciated that any number of additional or alternative tasks may be included, and may be incorporated into a more comprehensive procedure or process having additional functionality not described in detail herein.

Referring to FIG. 2, and with continued reference to FIG. 1, a control process 200 may be performed to shutdown or otherwise deactivate a matrix converter 108 being used to deliver energy (or current) from/to an AC energy source 120 while preventing undesirable voltage spikes within the electrical system 100. The control process 200 initializes or begins by detecting or otherwise identifying a shutdown condition (task 202). In this regard, a shutdown condition is a condition indicative of a desire to stop operating the switches of the matrix converter 108, which in turn, prevents voltage from being induced across nodes 122 and 124 of the isolation module 106. For example, in accordance with one embodiment, the control module 116 may be coupled to the DC energy source 118, wherein the control module 116 monitors the state of charge of the DC energy source 118 and identify a shutdown condition when a state of charge of the DC energy source 118 is at or above a predetermined upper state of charge threshold to prevent overcharging of the DC energy source 118. In another embodiment, the control module 116 may identify a shutdown condition when the DC interface 102 is about to be disconnected from a DC energy source 118, for example, in response to a notification from a user or a higher level control module (e.g., an electronic control unit), or when the voltage at the DC interface 102 falls below a threshold value. In other embodiments, the control module 116 may identify a shutdown condition in response to detecting or otherwise being notified of an error condition within the electrical system 100. For example, the control module 116 may identify a shutdown condition in response to identifying a current at the DC interface 102 that is greater than a threshold value such that it is indicative of a fault condition (e.g., a short circuit) at the DC interface 102. In yet other embodiments, the control module 116 may identify a shutdown condition in response to being notified of a desire to shutdown the matrix converter 108 initiated by a user or a higher level control module (e.g., an electronic control unit), as will be appreciated in the art. Additionally, in some embodiments, the control module 116 may identify a shutdown condition when the AC interface 114 is about to be disconnected from the AC energy source 120, for example, in response to a notification from a user or a higher level control module (e.g., an electronic control unit).

In an exemplary embodiment, in response to identifying a shutdown condition, the control process 200 continues by operating the matrix converter using a shutdown duty cycle (task 204). In this regard, in an exemplary embodiment, the shutdown duty cycle comprises a reduced duty cycle that maintains current through the inductor 110 to prevent transient voltage spikes that may otherwise occur if the flow of current through the inductor 110 were abruptly interrupted. In accordance with one or more embodiments, the shutdown duty cycle may be configured to supply a reduced amount of current to the DC interface 102. In an exemplary embodiment, the control module 116 generates pulse-width modulated (PWM) command signals having the shutdown duty cycle and operating the switches (S1-S8) of the matrix converter 108 in accordance with the PWM command signals. The PWM signals that control the timing of the switching elements (S1-S8) of the matrix converter 108 over a switching interval (or PWM cycle), that is, when a respective switching element (S1-S8) is closed, turned on, or otherwise activated, wherein the shutdown duty cycle dictates when the respective switching element (S1-S8) is opened, turned off, or otherwise deactivated during the switching interval (or PWM cycle).

In an exemplary embodiment, the control module 116 determines and/or calculates the shutdown duty cycle ($d_r$) for the switching elements (S1-S8) of the matrix converter 108 in accordance with the equation $d_r=1-U$, wherein U is governed by the equation $$U = \left| \frac{V_{AC}}{\sqrt{P_{OUT} \times R_L}} \right|,$$

where $V_{AC}$ is the voltage at the AC interface 114, $R_L$ is the effective resistance at the DC interface 102, and $P_{OUT}$ is a constant representing the desired (or commanded) output power at the DC interface 102 at the time of the shutdown condition (e.g., at the time of identifying the shutdown condition). The control module 116 may be coupled to the DC interface 102 and measure or otherwise obtain the voltage and the current at the DC interface 102 and calculate the effective resistance at the DC interface 102 ($R_L$) based on Ohm's law, wherein $$R_L = \frac{V_{DC}}{i_{DC}}.$$

In this manner, the shutdown duty cycle may be based at least in part on the voltage at the AC interface 114 ($V_{AC}$), the voltage at the DC interface 102 ($V_{DC}$), and the current at the DC interface 102 ($i_{DC}$). After calculating the shutdown duty cycle, the control module 116 determines PWM signals that control the timing of the switching elements (S1-S8) of the matrix converter 108, as will be appreciated in the art.

In an exemplary embodiment, the control process 200 continues by obtaining the current ($i_L$) through the inductor 110 and monitoring the current through the inductor 110 to determine or otherwise detect when the magnitude of the current through the inductor is less than a threshold value (e.g., $|i_L|<i_{TH}$) (tasks 206, 208). The threshold value ($i_{TH}$) for the inductor current is chosen such that an inductor current ($i_L$) less than the threshold value indicates that the inductor current ($i_L$) is sufficiently close to zero such that the inductor 110 can be discharged and current through the inductor 110 interrupted without producing damaging voltage spikes, as described in greater detail below. In this manner, an inductor current ($i_L$) less than the threshold value indicates current through the inductor 110 is approaching a zero crossing or otherwise near a zero crossing with a sufficiently high likelihood. In an exemplary embodiment, the threshold value ($i_{TH}$) for the inductor current is chosen to be less than or equal to about 0.1 Amps. The control module 116 obtains or otherwise measures the current through the inductor (e.g., via a current sensor configured between the inductor 110 and node 132 or node 140), and compares the obtained inductor current ($i_L$) to the threshold value ($i_{TH}$). The loop defined by tasks 204, 206 and 208 repeats such that the control module 116 operates the matrix converter 108 in accordance with the shutdown duty cycle as long as the inductor current ($i_L$) is greater than the threshold value ($i_{TH}$).

In response to determining the inductor current ($i_L$) is less than the threshold value ($i_{TH}$), the control process 200 continues by obtaining the voltage at the AC interface and determining whether the magnitude of the voltage at the AC interface is less than a threshold value (e.g., $|V_L|<V_{TH}$) in order to verify the inductor current is at or near zero (tasks 209, 210). The threshold value ($V_{TH}$) for the AC voltage is chosen such that an AC voltage less than the threshold value indicates that the voltage ($V_{AC}$) at the AC interface 114 is at or near a zero crossing with a sufficiently high likelihood. For example, in accordance with one embodiment, the threshold value ($V_{TH}$) for the AC voltage is chosen to be about 10 Volts. The matrix converter 108 may be operated at a relatively high power factor (e.g., as near to unity power factor as possible) such that the inductor current ($i_L$) is substantially in-phase with the current and/or voltage at the AC interface 114, and as a result, a voltage at the AC interface 114 that is at or near a zero crossing also indicates the inductor current ($i_L$) is at or near zero. Thus, determining the voltage at the AC interface ($V_{AC}$) is less than the threshold value ($V_{TH}$) provides redundancy and added verification that the inductor current ($i_L$) is at or near zero crossing. In this regard, in alternative embodiments where the matrix converter 108 is operated at unity power factor, the control process 200 may be implemented without determining whether the magnitude of the voltage at the AC interface is less than a threshold value. In an exemplary embodiment, the loop defined by tasks 204, 206, 208, 209 and 210 repeats as long as either the inductor current ($i_L$) is greater than the threshold value ($i_{TH}$) or the voltage at the AC interface ($V_{AC}$) is greater than the threshold value ($V_{TH}$).

In an exemplary embodiment, when the inductor current ($i_L$) is less than the threshold value ($i_{TH}$) and the voltage at the AC interface ($V_{AC}$) is less than the threshold value ($V_{TH}$), the control process 200 continues by discharging the inductive element 110 between the matrix converter 108 and the AC interface 114 before deactivating the matrix converter 108 (tasks 212, 214). In this regard, in an exemplary embodiment, the control module 116 discharges the inductor 110 by operating the switching elements (S1-S8) of the matrix converter 108 to provide an electrical connection between nodes 132 and 138 that effectively short-circuits nodes 132 and 138 together during one switching interval (or PWM cycle). Depending on the embodiment, the control module 116 provides an electrical connection between nodes 132 and 138 by either closing, turning on, or otherwise activating switches S1, S2, S7 and S8 concurrently while maintaining switches S3, S4, S5 and S6 in an opened or OFF state, or alternatively, by closing, turning on, or otherwise activating switches S3, S4, S5 and S6 concurrently while maintaining switches S1, S2, S7 and S8 in an opened or OFF state over the PWM cycle. In yet another embodiment, the control module 116 may provide an electrical connection between nodes 132 and 138 by closing, turning on, or otherwise activating all of the switches S1-S8 of the matrix converter 108 over the PWM cycle. When the voltage at the AC interface is at or near a zero crossing, providing an electrical connection between nodes 132 and 138 results in a voltage at or near zero (e.g., a voltage less than the threshold value) being applied across the inductor 110, effectively short-circuiting the inductor 110 (e.g., little or no voltage across the inductor 110). Additionally, when the voltage at the AC interface is at or near a zero crossing, providing an electrical connection between nodes 132 and 138 results in a voltage at or near zero (e.g., a voltage less than the threshold value) being applied across the capacitor 112, effectively short-circuiting the capacitor 112 (e.g., little or no voltage across capacitor 112). Thus, the control process 200 ensures the inductor 110 and the capacitor 112 each have little or no stored potential energy and/or voltage. After discharging the reactive components between the matrix converter 108 and the AC interface 114, the control module 116 deactivates the matrix converter 108 by opening, turning off, or otherwise deactivating each of switches S1-S8 during the next PWM cycle.

After deactivating the matrix converter, in an exemplary embodiment, the control process 200 continues by providing indication that the shutdown of the matrix converter has been completed (task 216). In this regard, the control module 116 may generate a flag or otherwise provide notification to a higher level control system (e.g., an electronic control unit) that the matrix converter 108 has been shut down or otherwise deactivated. In an exemplary embodiment, the control module 116 and maintains the switches of the matrix converter 108 in an opened or OFF state for subsequent PWM cycles unless otherwise instructed.

Figure 3:
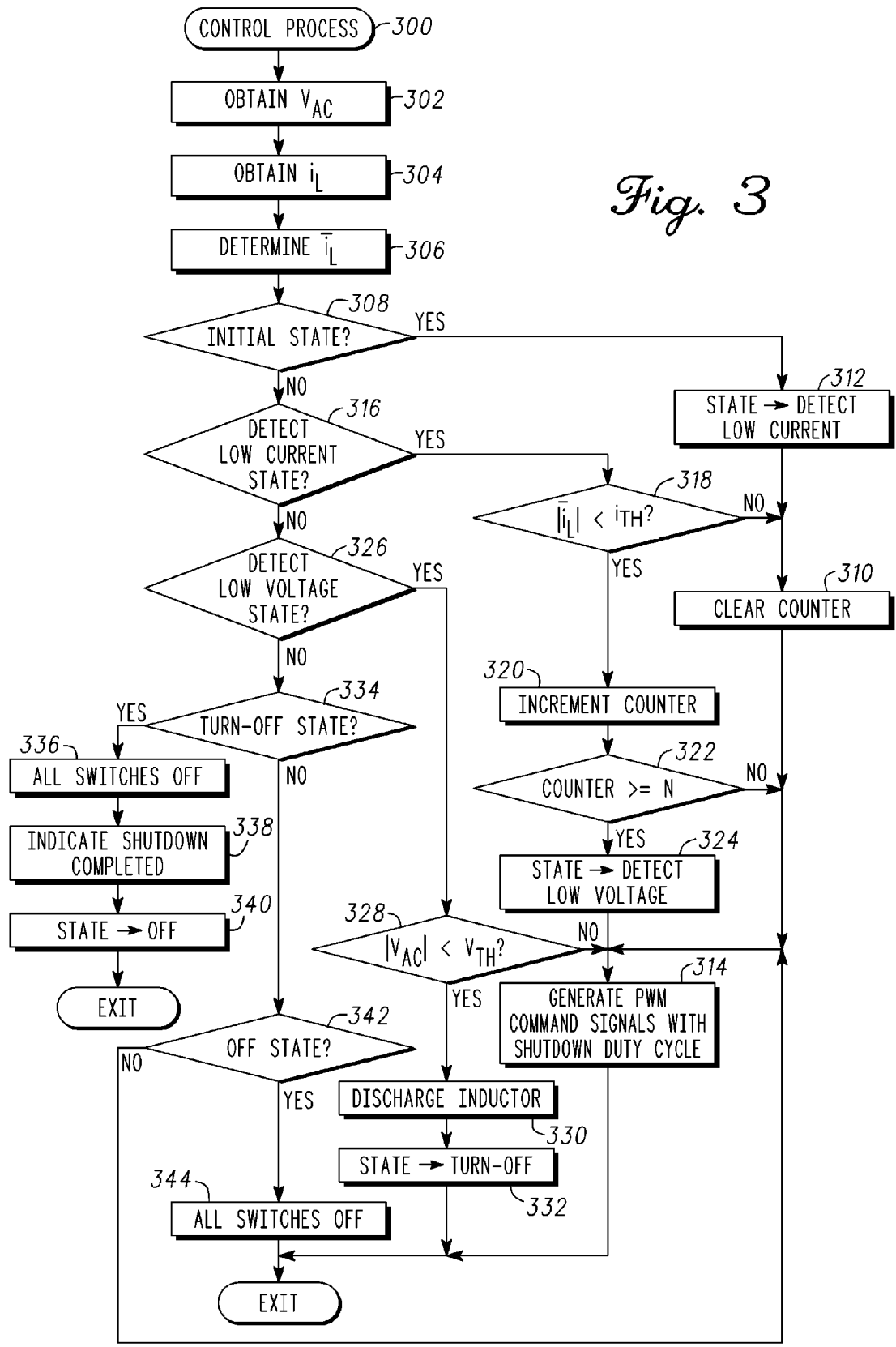
FIG. 3 is a flow diagram of control process suitable for use with the electrical system of FIG. 1 in accordance with one embodiment.

Referring now to FIG. 3, in accordance with one embodiment, a control module 116 may be configured to perform a control process 300 and additional tasks, functions, and operations described below in response to an interrupt request after identifying a shutdown condition as described above (e.g., task 202). In an exemplary embodiment, the interrupt request is generated or otherwise received by the control module 116 at fixed regular intervals. For example, in accordance with one embodiment, the control module 116 receives an interrupt signal every twenty microseconds that causes the control module 116 to execute the control process 300. In an exemplary embodiment, the control process 300 is implemented as a state machine, wherein the control process 300 initializes in a first state (e.g., the INITIAL state or state 1).

The control process 300 begins by sampling or otherwise obtaining the voltage at the AC interface 114 (task 302). In this regard, the control module 116 is coupled to the AC interface 114 and obtains a measured value of the voltage at the AC interface 114 ($V_{AC}$) (e.g., by sampling and/or reading a value from a voltage sensor) as described above. The control process 300 continues by sampling or otherwise obtaining the current through the inductor 110 (task 304). In this regard, the control module 116 obtains a measured value of the inductor current ($i_L$) (e.g., by sampling and/or reading a value from a current sensor) as described above. In an exemplary embodiment, the control process 300 continues by determining a moving average ($\bar{i}_L$) for the inductor current (task 306). Determining a moving average reduces the effects of noise on the measured values for the inductor current, as will be appreciated in the art. The control module 116 determines the moving average ($\bar{i}_L$) of the inductor current based on the most recently obtained value of the inductor current ($i_L$) and previously obtained values for the inductor current. In this regard, the control module 116 updates the moving average of the inductor current to reflect the most recently obtained value for the inductor current during the current iteration of the control process 300 (e.g., the value obtained in task 304).

In response to determining the current state of the state machine corresponds to the first state (e.g., the INITIAL state), the control process 300 continues by changing or otherwise updating the state of the state machine to a second state (e.g., a DETECT LOW CURRENT state or state 2), clearing a counter, and generating PWM command signals for the switches of the matrix converter 108 having a shutdown duty cycle (tasks 308, 310, 312, 314). In this regard, the control module 116 generates PWM signals that control the timing of switches (S1-S8) of the matrix converter 108 for the next PWM cycle with a shutdown duty cycle ($d_r$) in a similar manner as described above (e.g., task 204).

In response to determining the current state of the state machine corresponds to the second state (e.g., the DETECT LOW CURRENT), the control process 300 continues by determining whether the current through the inductor is less than a threshold value (tasks 316, 318). In an exemplary embodiment, the control module 116 compares the moving average ($\bar{i}_L$) for the inductor current to the threshold value ($i_{TH}$) to determine whether the inductor current ($i_L$) is at or sufficiently near a zero crossing, as described above (e.g., task 208). If the moving average ($\bar{i}_L$) for the inductor current is not less than the threshold value ($i_{TH}$), the control process 300 continues by clearing the counter and generating PWM command signals as described above (tasks 310, 314). If the moving average ($\bar{i}_L$) for the inductor current is less than the threshold value ($i_{TH}$), the control process 300 continues by incrementing the counter and determining whether the value of the counter exceeds is greater than or equal to a threshold number (N) (tasks 320, 322). In this regard, the threshold number (N) is chosen such that when the moving average ($\bar{i}_L$) for the inductor current is less than the threshold value for the threshold number (N) of iterations through control process 300 indicates that the inductor current ($i_L$) is at or near a zero crossing with a sufficiently high likelihood. If the value of the counter exceeds is greater than or equal to the threshold number (N), the control process 300 changes or otherwise updates the state of the state machine to the third state (e.g., a DETECT LOW VOLTAGE state or state 3) (task 324) before generating PWM command signals (task 314).

In response to determining the current state of the state machine corresponds to the third state (e.g., the DETECT LOW VOLTAGE state), the control process 300 continues by determining whether the voltage at the AC interface is less than a threshold value (tasks 326, 328) in a similar manner as described above (e.g., task 210). When the voltage ($V_{AC}$) at the AC interface 114 is less than the threshold value ($V_{TH}$), the control process 300 continues by discharging the inductor and changing or otherwise updating the state of the state machine to a fourth state (e.g., the TURN-OFF state or state 4) (tasks 330, 332). In this regard, the control module 116 generates command signals to discharge the inductor 110 in a similar manner as described above (e.g., task 212). Otherwise, when the voltage ($V_{AC}$) at the AC interface 114 is not less than the threshold value ($V_{TH}$), the control process 300 continues generating PWM command signals as described above (task 314).

In response to determining the current state of the state machine corresponds to the fourth state (e.g., the TURN-OFF state), the control process 300 continues by opening, turning off or otherwise deactivating the each of the switches of the matrix converter and generating a signal or flag that indicates the matrix converter 108 has been shutdown or otherwise deactivated (tasks 334, 336, 338). In this regard, the control module 116 opens, turns off, or otherwise deactivates the switches (S1-S8) of the matrix converter 108 and generates a flag in a similar manner as described above (e.g., tasks 214, 216). The control process 300 continues by changing or otherwise updating the state of the state machine to a fifth state (e.g., the OFF state or state 5) (task 340). During subsequent cycles, when the current state of the state machine corresponds to fifth state (e.g., the OFF state), the control process 300 maintains the switches of the matrix converter 108 in the opened or OFF state (tasks 342, 344).

One advantage of the systems and/or methods described above is that any potential energy of reactive components between the matrix converter and the AC energy source is discharged before deactivating or otherwise shutting down the matrix converter. This prevents reactive components from producing large voltage spikes when the flow of current to the matrix converter would be interrupted by turning OFF or opening the switches. This reduces the voltage and/or power handling requirement for components of the matrix converter, which in turn, reduces the size and/or cost for the components of the matrix converter. Additionally, the matrix converter may be implemented with smaller snubbers across the switches, or in some embodiments, without using any snubbers.

For the sake of brevity, conventional techniques related to electrical energy and/or power conversion, electrical charging systems, power converters, pulse-width modulation (PWM), and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An electrical system comprising:
an alternating current (AC) interface coupled to an AC energy source;
a conversion module coupled to the AC interface;
an inductive element coupled electrically in series between the AC interface and the conversion module; and
a control module coupled to the conversion module, wherein in response to a shutdown condition, the control module is configured to:
operate the conversion module with a shutdown duty cycle to maintain current through the inductive element;
monitor the current through the inductive element; and
when the current through the inductive element is less than a threshold value:
operate the conversion module to discharge the inductive element; and
deactivate the conversion module after operating the conversion module to discharge the inductive element to prevent current flow to the conversion module.

2. The electrical system of claim 1, the conversion module comprising a plurality of switching elements, wherein the control module is configured to operate the conversion module with the shutdown duty cycle by:
generating pulse-width modulation (PWM) command signals having a reduced duty cycle; and
operating the plurality of switching elements in accordance with the PWM command signals.

3. The electrical system of claim 1, further comprising:
a direct current (DC) interface;
a first conversion module coupled to the DC interface; and
an isolation module coupled between the first conversion module and the conversion module, the isolation module providing galvanic isolation between the first conversion module and the conversion module.

4. The electrical system of claim 3, the shutdown duty cycle being equal to 1−U, wherein U is governed by the equation $$U = \left| \frac{V_{AC}}{\sqrt{P_{OUT} \times R_L}} \right|,$$

where $V_{AC}$ represents a voltage at the AC interface, $R_L$, represents an effective resistance at the DC interface, and $P_{OUT}$ corresponds to an output power at the DC interface.

5. The electrical system of claim 1, further comprising:
a direct current (DC) interface;
a first conversion module coupled to the DC interface; and
an isolation module coupled between the first conversion module and the conversion module, the isolation module providing galvanic isolation between the first conversion module and the conversion module, wherein the shutdown duty cycle supplies a reduced amount of current to the DC interface.

6. The electrical system of claim 1, wherein the control module is configured to:
operate the conversion module to discharge the inductive element by closing all switches of the conversion module; and
deactivate the conversion module by opening all the switches of the conversion module.

7. An electrical system comprising:
an alternating current (AC) interface;
a conversion module coupled to the AC interface;
an inductive element coupled between the AC interface and the conversion module; and
a control module coupled to the conversion module to deactivate the conversion module when a magnitude of a current through the inductive element is less than a threshold value in response to a shutdown condition, wherein the conversion module comprises:
a first node coupled to the inductive element;
a second node coupled to the AC interface;
a third node;
a fourth node;
a first switch coupled between the first node and the third node, the first switch being configured to allow current from the third node to the first node when the first switch is closed;
a second switch coupled between the first switch and the third node, the second switch being configured to allow current from the first node to the third node when the second switch is closed;
a third switch coupled between the first node and the fourth node, the third switch being configured to allow current from the fourth node to the first node when the third switch is closed;

a fourth switch coupled between the third switch and the fourth node, the fourth switch being configured to allow current from the first node to the fourth node when the fourth switch is closed;

a fifth switch coupled between the second node and the fourth node, the fifth switch being configured to allow current from the second node to the fourth node when the fifth switch is closed;

a sixth switch coupled between the fifth switch and the second node, the sixth switch being configured to allow current from the fourth node to the second node when the sixth switch is closed;

a seventh switch coupled between the second node and the third node, the seventh switch being configured to allow current from the second node to the third node when the seventh switch is closed; and an eighth switch coupled between the seventh switch and the second node, the eighth switch being configured to allow current from the third node to the second node when the eighth switch is closed.

8. The electrical system of claim 7, wherein the control module is configured to operate the conversion module to provide an electrical connection between the first node and the second node to discharge the inductive element when current through the inductive element is less than the threshold value prior to deactivating the conversion module.

9. The electrical system of claim 8, wherein the control module is configured to provide the electrical connection between the first node and the second node by concurrently closing the first switch, the second switch, the seventh switch, and the eighth switch.

10. The electrical system of claim 8, wherein the control module is configured to provide the electrical connection between the first node and the second node by concurrently closing the third switch, the fourth switch, the fifth switch, and the sixth switch.

11. The electrical system of claim 8, wherein the control module is configured to deactivate the conversion module by opening the first switch, the second switch, the third switch, the fourth switch, the fifth switch, the sixth switch, the seventh switch, and the eighth switch after providing the electrical connection between the first node and the second node.

12. A method for controlling an electrical system including a conversion module and an inductive element configured electrically in series between the conversion module and an AC interface coupled to an AC energy source, the method comprising:
operating the conversion module to achieve a desired flow of energy from the AC interface;
identifying a shutdown condition; and
in response to identifying the shutdown condition:
operating the conversion module with a shutdown duty cycle to maintain current through the inductive element;
monitoring current through the inductive element; and
when a magnitude of the current through the inductive element is less than a threshold value:
operating the conversion module to discharge the inductive element; and
deactivating the conversion module after operating the conversion module to discharge the inductive element to prevent current flow to the conversion module.

13. The method of claim 12, further comprising monitoring voltage at the AC interface, wherein the conversion module is operated to discharge the inductive element when the magnitude of the current through the inductive element is less than the threshold value and a magnitude of the voltage at the AC interface is less than a second threshold value.

14. The method of claim 12, the electrical system including a direct current (DC) interface, a first conversion module, and an isolation module coupled between the conversion module and the first conversion module, the isolation module providing galvanic isolation between the conversion module and the second conversion module, wherein operating the conversion module using the shutdown duty cycle further comprises calculating the shutdown duty cycle based at least in part on a voltage at the AC interface and an effective resistance at the DC interface.

15. The method of claim 12, wherein:
operating the conversion module with the shutdown duty cycle comprises operating switches of the conversion module in accordance with pulse-width modulation (PWM) command signals having the shutdown duty cycle;
operating the conversion module to discharge the inductive element comprises closing all of the switches of the conversion module; and
deactivating the conversion module comprises opening all of the switches of the conversion module.

16. An electrical system comprising:
a direct current (DC) interface;
a conversion module coupled to the DC interface;
an alternating current (AC) interface;
a second conversion module coupled to the AC interface;
an inductive element coupled between the AC interface and the second conversion module;
an isolation module coupled between the first conversion module and the second conversion module, the isolation module providing galvanic isolation between the first conversion module and the second conversion module; and
a control module coupled to the second conversion module, wherein in response to a shutdown condition, the control module is configured to:
operate the second conversion module with a shutdown duty cycle, wherein the shutdown duty cycle is equal to 1−U, wherein U is governed by the equation $$U = \left| \frac{V_{AC}}{\sqrt{P_{OUT} \times R_L}} \right|,$$

where $V_{AC}$ represents a voltage at the AC interface, $R_L$ represents an effective resistance at the DC interface, and $P_{OUT}$ corresponds to an output power at the DC interface; and
when a magnitude of the current through the inductive element is less than a threshold value:
operate the second conversion module to discharge the inductive element; and
deactivate the second conversion module after discharging the inductive element.

17. The electrical system of claim 16, wherein:
the second conversion module includes a first node connected to the AC interface and a second node;
the inductive element is connected electrically in series between the AC interface and the second node; and
when the magnitude of the current through the inductive element is less than the threshold value, the control module operates the second conversion module short-circuit the first node and the second node to discharge the inductive element.

18. The electrical system of claim 17, further comprising a capacitive element connected between the inductive element and the first node.

* * * * *